US012715532B2

(12) United States Patent
Sawada et al.

(10) Patent No.: US 12,715,532 B2
(45) Date of Patent: Aug. 25, 2026

(54) INSTALLATION STRUCTURE FOR HEADLAMP

(71) Applicant: SUZUKI MOTOR CORPORATION, Hamamatsu (JP)

(72) Inventors: Fujimi Sawada, Hamamatsu (JP); Ryoji Tanaka, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 19/221,362

(22) Filed: May 28, 2025

(65) Prior Publication Data

US 2026/0015055 A1 Jan. 15, 2026

(30) Foreign Application Priority Data

Jul. 11, 2024 (JP) ................................ 2024-111730

(51) Int. Cl.

*B62J 6/026* (2020.01)
*F21S 41/19* (2018.01)
*F21S 45/48* (2018.01)
*F21W 107/13* (2018.01)

(52) U.S. Cl.

CPC ............... *B62J 6/026* (2020.02); *F21S 41/19* (2018.01); *F21S 45/48* (2018.01); *F21W 2107/13* (2018.01)

(58) Field of Classification Search

CPC .. F21S 45/48; F21S 41/40; F21S 41/47; B62J 6/026; B62J 6/027; F21W 2107/13; B60Q 1/0466

See application file for complete search history.

(56) References Cited

U.S. PATENT DOCUMENTS 3,922,031 A * 11/1975 Hugon ..................... B62J 17/02 296/78.1
2018/0264993 A1 9/2018 Takenaka et al. ... B60Q 1/0408

FOREIGN PATENT DOCUMENTS

EP 2479090 A2 * 7/2012 .............. B62J 6/026
EP 3015347 A1 * 5/2016 ........... B60Q 1/0041
EP 4039568 A1 * 8/2022 ............. B60Q 1/045
JP 2013067339 A * 4/2013 ............. B62K 11/04
JP 6490728 B2 3/2019

* cited by examiner

*Primary Examiner* — Erin Kryukova
(74) *Attorney, Agent, or Firm* — Stein IP, LLC

(57) ABSTRACT

An installation structure for a headlamp includes a headlamp including a lens configured to emit irradiation light toward a front of a vehicle, a lamp cover having an opening through which the lens is exposed, and an elastic cover configured to close a gap between the headlamp and the opening of the lamp cover. The headlamp is configured to be moved with respect to the lamp cover to adjust an optical axis. The elastic cover closes the gap between the headlamp and the opening of the lamp cover regardless of a direction of the optical axis of the headlamp.

8 Claims, 7 Drawing Sheets

Re
Fr
1
10
11
12
13
14
15
21
22
23
24
25
26
27
28
31
32
33
35
36
37
38
39
41
61

INSTALLATION STRUCTURE FOR HEADLAMP

CROSS-REFERENCE TO RELATED APPLICATIONS

This application is based on and claims priority under 35 USC 119 from Japanese Patent Application No. 2024-111730 filed on Jul. 11, 2024, the entire content of which is incorporated herein by reference.

TECHNICAL FIELD

The present disclosure relates to an installation structure for a headlamp.

BACKGROUND ART

In the related art, a straddle-type vehicle in which a lens surface of a headlamp is exposed from an opening of a front cover is known (for example, refer to JP6490728B). In the headlamp described in JP6490728B, a dome-shaped outer lens is attached to a front opening of a lamp housing. A light source is installed on a rear surface of the lamp housing via a substrate, and an inner lens is installed inside the outer lens and in front of the light source. Light emitted from the light source passes through the inner lens and the outer lens, and the front of the vehicle is illuminated by the light emitted to the outside from the outer lens.

When an optical axis of the headlamp is adjusted from the outside, the headlamp is moved independently of a lamp cover. Therefore, it is necessary to form an opening of the lamp cover larger than that of the headlamp. When a gap between the headlamp and the opening of the lamp cover is large, the appearance of the vehicle may be deteriorated, and there is a risk that the light from the headlamp may leak to the outside, impairing the field of vision of a rider.

SUMMARY OF INVENTION

Aspect of non-limiting embodiments of the present disclosure relates to provide an installation structure for a headlamp capable of preventing light leakage from the headlamp while restraining deterioration of appearance.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an installation structure for a headlamp including:

a headlamp including a lens configured to emit irradiation light toward a front of a vehicle;

a lamp cover having an opening through which the lens is exposed; and an elastic cover configured to close a gap between the headlamp and the opening of the lamp cover, in which the headlamp is configured to be moved with respect to the lamp cover to adjust an optical axis, and the elastic cover closes the gap between the headlamp and the opening of the lamp cover regardless of a direction of the optical axis of the headlamp.

BRIEF DESCRIPTION OF DRAWINGS

Exemplary embodiment(s) of the present invention will be described in detail based on the following figures, wherein.

DESCRIPTION OF EMBODIMENTS

A headlamp according to one aspect of the present disclosure is provided with a lens that emits irradiation light toward the front of a vehicle. In an installation structure for the headlamp, an opening for exposing the lens is formed in a lamp cover, and a gap between the headlamp and the opening of the lamp cover is closed by an elastic cover. An optical axis is adjusted by moving the headlamp with respect to the lamp cover, and the elastic cover closes the gap between the headlamp and the opening of the lamp cover regardless of a direction of the optical axis of the headlamp. Even if the opening of the lamp cover is formed large in order to adjust the optical axis by moving the headlamp with respect to the lamp cover, the gap between the headlamp and the lamp cover is closed by the elastic cover, thereby improving the appearance. Further, the adjustment to the optical axis of the headlamp is not hindered due to the deformation of the elastic cover, and the light leakage from the headlamp is prevented by the elastic cover, so that the field of vision of a rider is not impaired.

Embodiment

Figure 1:
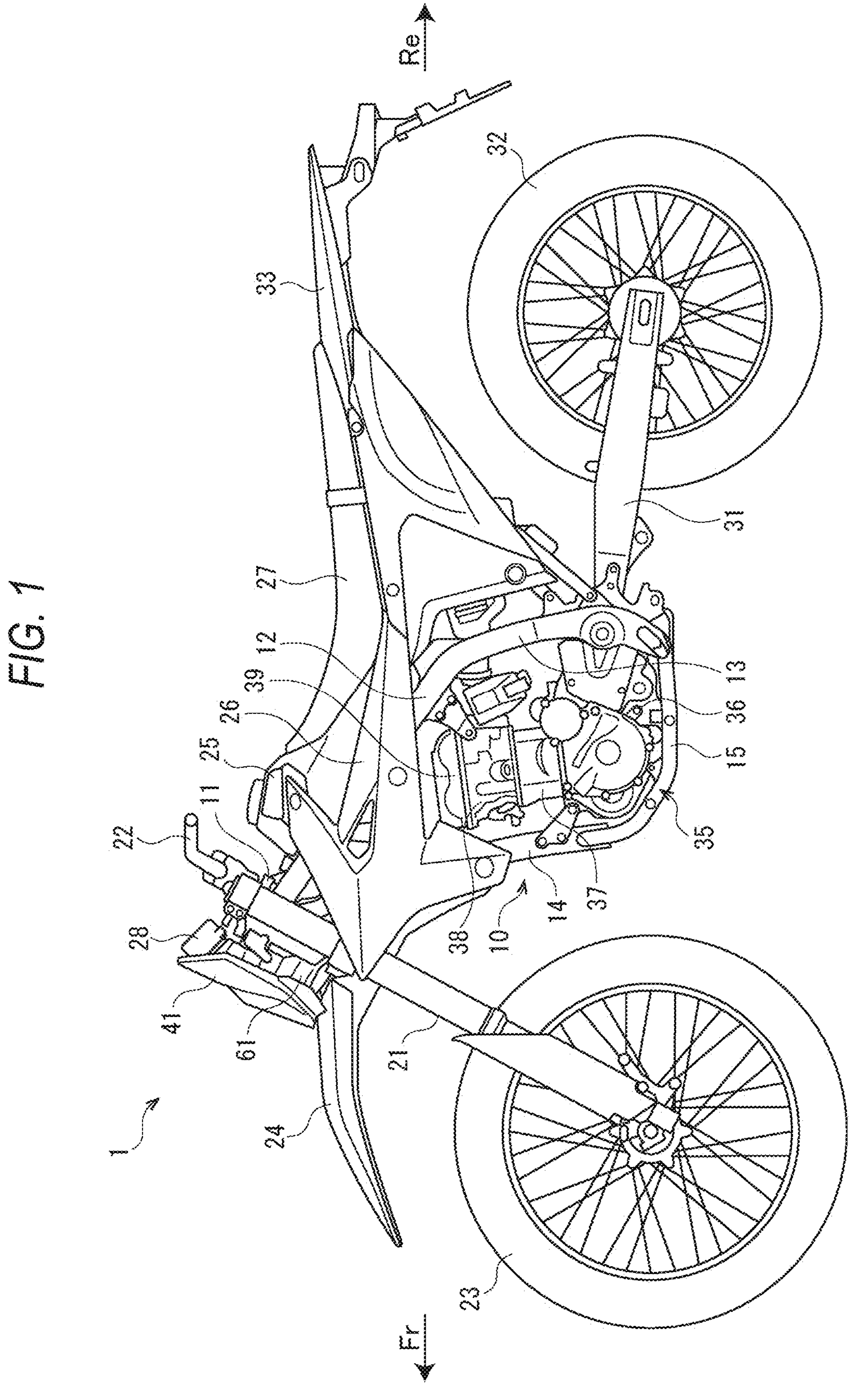
FIG. 1 is a left side view showing a vehicle internal structure according to the present embodiment.

Hereinafter, a straddle-type vehicle according to the present embodiment will be described with reference to the accompanying drawings. FIG. 1 is a left side view showing a vehicle internal structure according to the present embodiment. In the following drawings, an arrow Fr indicates a vehicle front side, an arrow Re indicates a vehicle rear side, an arrow L indicates a vehicle left side, and an arrow R indicates a vehicle right side.

As shown in FIG. 1, a straddle-type vehicle 1 is implemented by mounting various components such as an engine 35 and an electrical system on a vehicle body frame 10. A pair of main frames 12 extend obliquely rearward and downward from a head pipe 11 of the vehicle body frame 10, and rear portions of the pair of main frames 12 form a pair of body frames 13 bent downward. A down frame 14 extends downward from the head pipe 11. A pair of under loops 15 bent rearward are connected to a lower portion of the down frame 14. Rear ends of the pair of under loops 15 are connected to lower portions of the pair of body frames 13, so that the vehicle body frame 10 is formed into a cradle shape.

A front fork 21 is steerably supported by the head pipe 11 via a steering shaft (not shown). A handle 22 is provided at an upper portion of the front fork 21. A front wheel 23 is rotatably supported by a lower portion of the front fork 21. A front fender 24 is provided on the front fork 21, and the front wheel 23 is covered from above by the front fender 24. A fuel tank 25 is placed over upper portions of the pair of main frames 12, and the main frames 12 and the fuel tank 25 are covered with a front side cover 26 from a lateral side. A seat 27 is installed behind the fuel tank 25.

A swing arm 31 is swingably supported on the body frame 13. The swing arm 31 extends rearward from the body frame 13, and a rear wheel 32 is rotatably supported at a rear end of the swing arm 31. A rear fender 33 is installed behind the seat 27, and the rear wheel 32 is covered from above by the rear fender 33. The engine 35 is a four-stroke single-cylinder engine. The engine 35 is suspended inside the vehicle body frame 10 via a plurality of suspension brackets. A cylinder assembly in which a cylinder 37, a cylinder head 38, and a cylinder head cover 39 are stacked is attached to an upper portion of a crank case 36 of the engine 35.

A housing 61 is provided in front of the head pipe 11, and a meter 28 is attached to an upper portion of the housing 61. The housing 61 is covered by the lamp cover 41 from the front, and a lens of a headlamp 51 (see FIG. 3) is exposed from an opening of a lamp cover 41. The housing 61 is provided with an optical axis adjustment mechanism for the headlamp 51, and the optical axis adjustment mechanism moves the headlamp 51 independently of the housing 61 and the lamp cover 41. By appropriately adjusting an irradiation range and an irradiation direction of the headlamp 51, visibility at night or in bad weather is secured.

The opening of the lamp cover 41 is formed large so as not to interfere with the headlamp 51 when the headlamp 51 is moved independently of the lamp cover 41. A gap between the headlamp 51 and the lamp cover 41 becomes noticeable, the appearance of the vehicle is deteriorated, and there is a risk that irradiation light from the headlamp 51 may be reflected by a back surface of the lamp cover 41 and leak, which may impair the field of vision of a rider. Therefore, in the present embodiment, the gap between the opening of the lamp cover 41 and the headlamp 51 is closed by a rubber cover (elastic cover) 80. Even when the headlamp 51 is moved, the rubber cover 80 is deformed, so that the adjustment to the optical axis is not hindered by the rubber cover 80.

Figure 2:
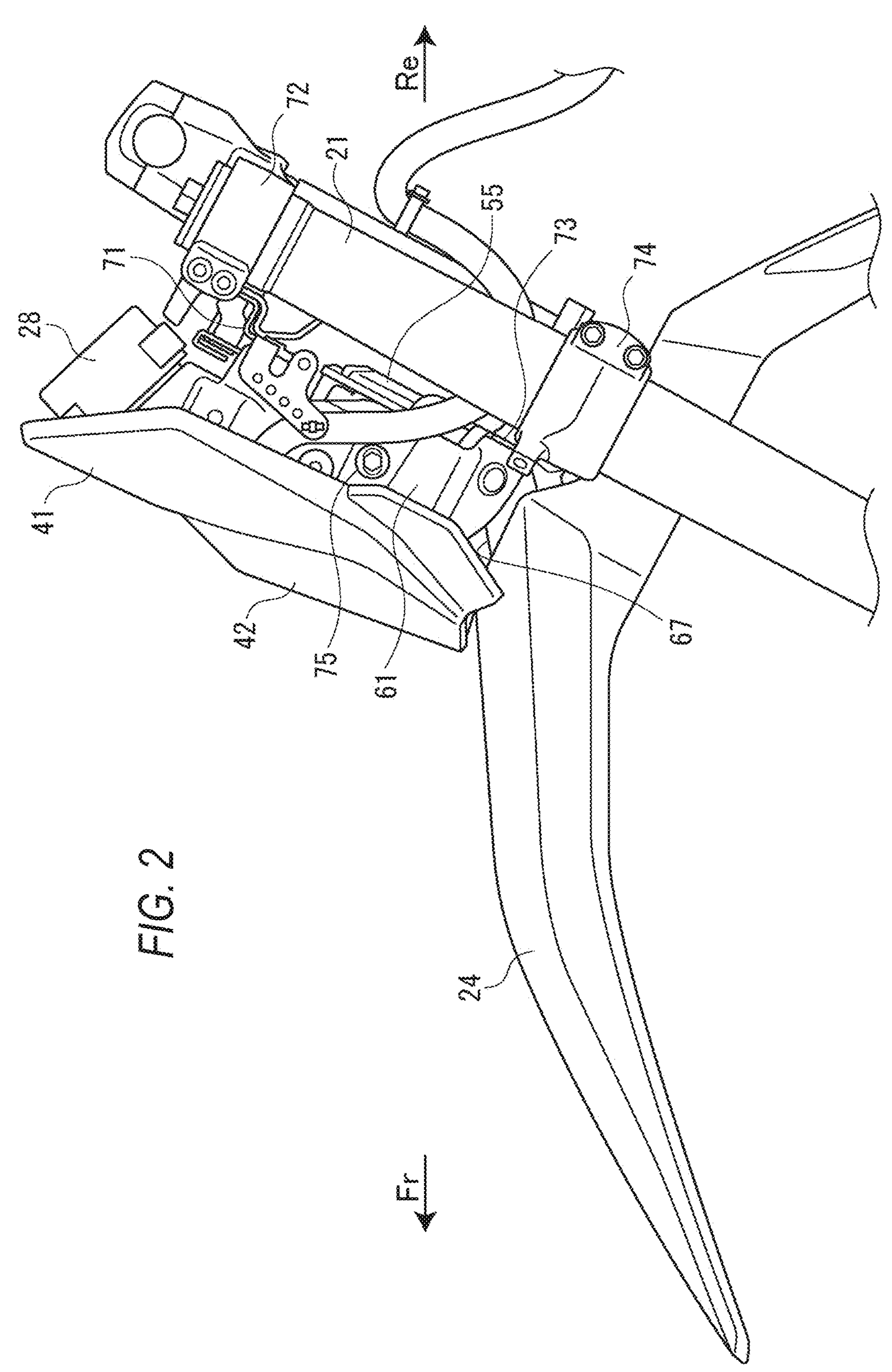
FIG. 2 is a left side view showing a periphery of a headlamp according to the present embodiment.
Figure 3:
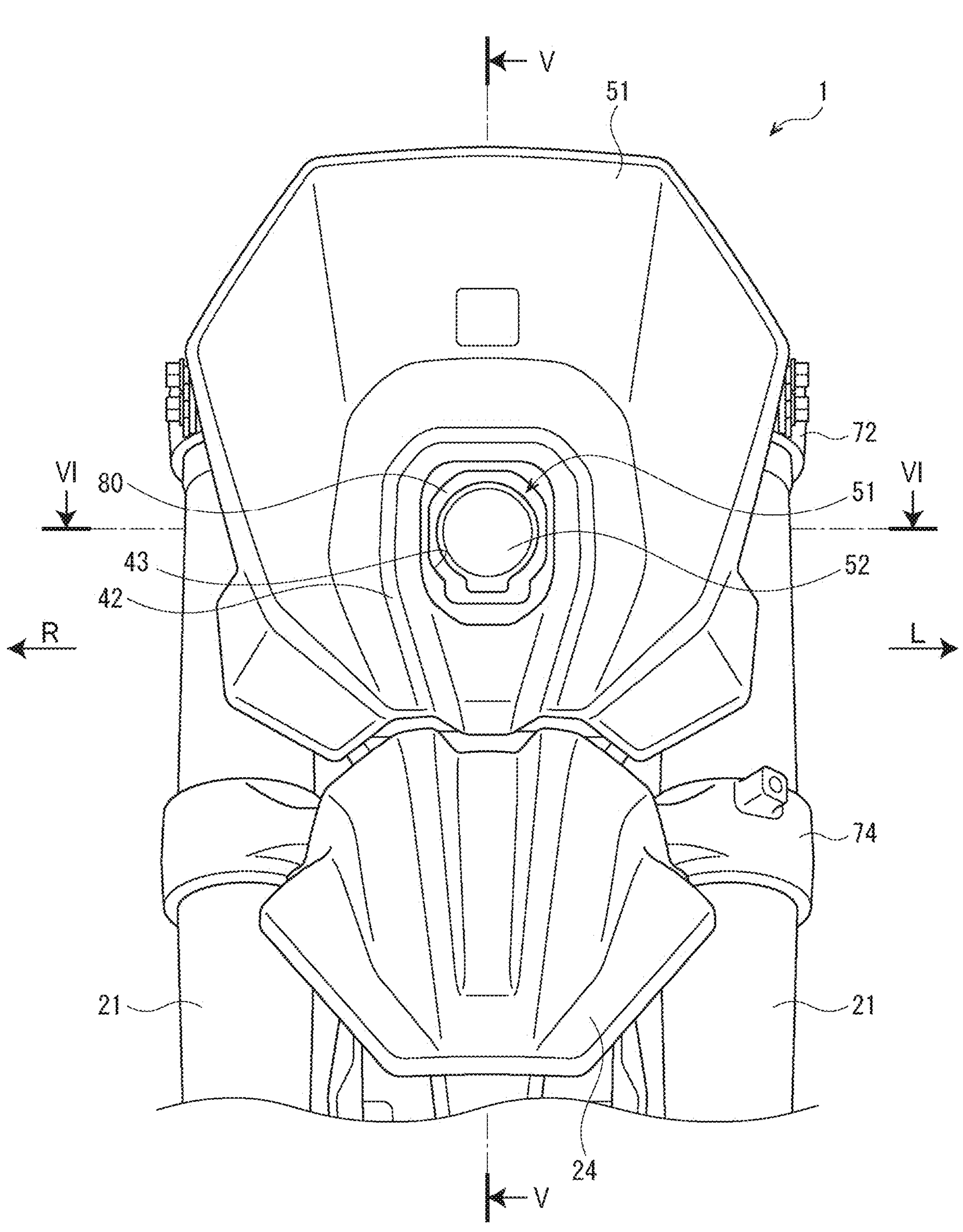
FIG. 3 is a front view showing the periphery of the headlamp according to the present embodiment.
Figure 4A:
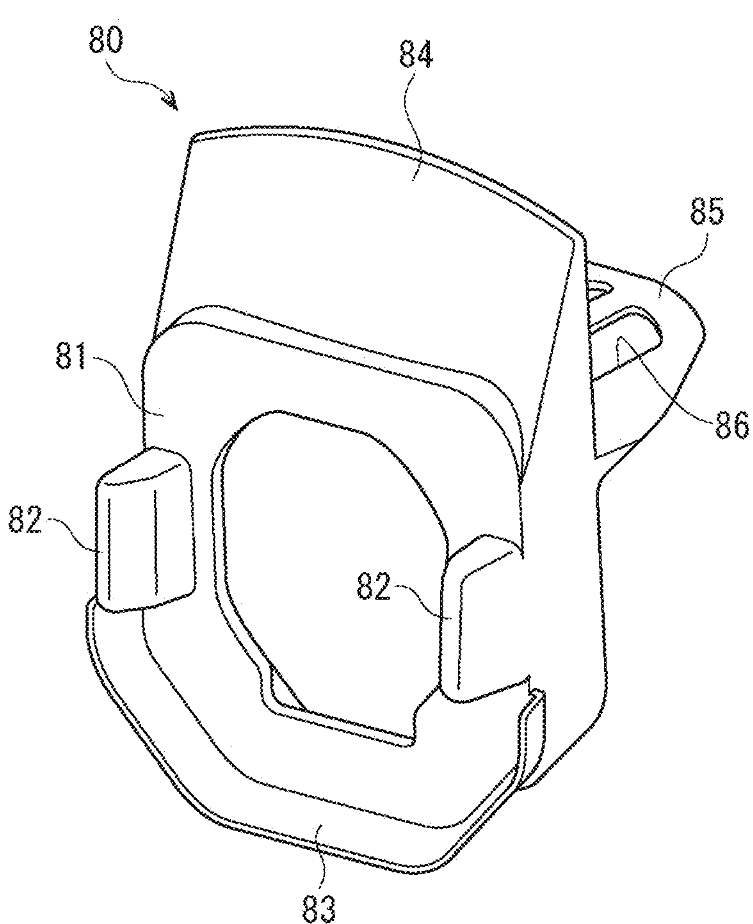
FIG. 4A is a perspective view of a rubber cover according to the present embodiment.
Figure 4B:
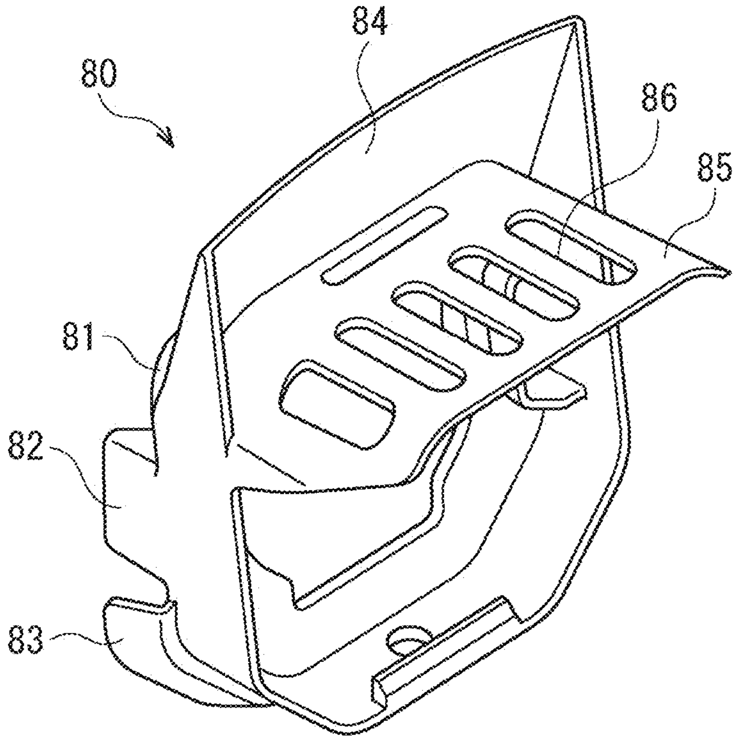
FIG. 4B is a perspective views of a rubber cover according to the present embodiment.

A peripheral structure of the headlamp and the rubber cover will be described with reference to FIGS. 2 to 4. FIG. 2 is a left side view showing a periphery of the headlamp according to the present embodiment. FIG. 3 is a front view showing the periphery of the headlamp according to the present embodiment. FIG. 4A and FIG. 4B are perspective views of the rubber cover according to the present embodiment. FIG. 4A is a perspective view of the rubber cover as viewed obliquely from the front, and FIG. 4B is a perspective view of the rubber cover as viewed obliquely from the rear.

As shown in FIGS. 2 and 3, the headlamp 51 is attached to a vehicle front portion of the straddle-type vehicle 1. The headlamp 51 is provided with a lens 52, and irradiation light is emitted from the lens 52 toward the front of the vehicle. The lamp cover 41 is installed around the headlamp 51, and an opening 43 for exposing the lens 52 is formed in the lamp cover 41. An inverted U-shaped bulging portion 42 is formed on a front surface of the lamp cover 41 so as to surround the upper side and both sides of the headlamp 51. A cover portion protrudes outward in a left-right direction and upward from an outer edge of the bulging portion 42 of the lamp cover 41.

A rear surface of the headlamp 51 is covered by the housing 61 from the rear side. The housing 61 is formed in a box shape with an open front surface, and the lamp cover 41 is attached to the housing 61 so as to cover the front of the housing 61. The meter 28 is attached to an upper surface of the housing 61, and a headlamp controller 55 is attached to a lower side of a rear surface of the housing 61. The upper portion of the housing 61 is supported by an upper bracket 72 of the front fork 21 via a support bracket 71. A lower portion of the housing 61 is supported by a lower bracket 74 of the front fork 21 via a support bracket 73.

Further, the headlamp 51 is formed such that the optical axis is configured to be adjusted (aimed) from the outside of the housing 61. The headlamp 51 is supported inside the housing 61 via a lamp bracket 58 (see FIG. 6) so as to be swingable in an upper-lower direction. A long hole (not shown) is formed in a left side surface of the housing 61, and the optical axis of the headlamp 51 is adjusted within the range of the long hole by an optical axis adjustment bolt 75 provided in the long hole. The rubber cover 80 is mounted around the headlamp 51, and a gap between the opening 43 of the lamp cover 41 and the headlamp 51 is closed by the rubber cover 80 to improve the appearance of the vehicle.

Even if the gap between the opening 43 of the lamp cover 41 and the headlamp 51 is filled with the rubber cover 80, the rubber cover 80 deforms in response to the swinging of the headlamp 51, so that the optical axis of the headlamp 51 can be adjusted. The front fender 24 having a beak shape is attached to the lower bracket 74, and the front fender 24 protects the headlamp 51 and the like from foreign matter kicked up by the front wheel 23 (see FIG. 1) by. The front fender 24 is installed below the housing 61, and the lamp cover 41 and the housing 61 are covered from below by the front fender 24.

As shown in FIG. 4A, a central portion of the rubber cover 80 is formed in a frame shape, and the headlamp 51 (see FIG. 2) is exposed through the inside of a frame-shaped portion 81 of the rubber cover 80. A pair of ribs 82 protrude forward from both side frames of the frame-shaped portion 81, and the pair of ribs 82 face each other in a vehicle width direction with an opening of the frame-shaped portion 81 in between. Opposing surfaces of the pair of ribs 82 are inclined outward in the vehicle width direction toward the front, and the opposing surfaces of the pair of ribs 82 are formed along a back surface of the bulging portion 42 (see FIG. 2) of the lamp cover 41. An extension portion 83 protrudes forward from a lower frame of the frame-shaped portion 81, and the extension portion 83 is formed along an opening edge 46 (see FIG. 5) of the lamp cover 41.

As shown in FIG. 4A and FIG. 4B, a vertical wall portion 84 protrudes toward the vehicle upper side from an upper frame (upper portion) of the frame-shaped portion 81 of the rubber cover 80, and the vertical wall portion 84 is formed along a rear surface of the lamp cover 41. A lateral wall portion 85 protrudes toward the vehicle rear side from the upper frame of the frame-shaped portion 81, and a rear space of the rubber cover 80 is partitioned into upper and lower spaces by the lateral wall portion 85. Although details will be described later, the headlamp 51 is accommodated below the lateral wall portion 85, and wiring 77 and a connector 78 (see FIG. 5) are accommodated above the lateral wall portion 85. A plurality of long holes (heat dissipation holes) 86 for heat dissipation are formed in the lateral wall portion 85, and hot air from the heat sink 54 of the headlamp 51 is discharged through the long holes 86.

Figure 5:
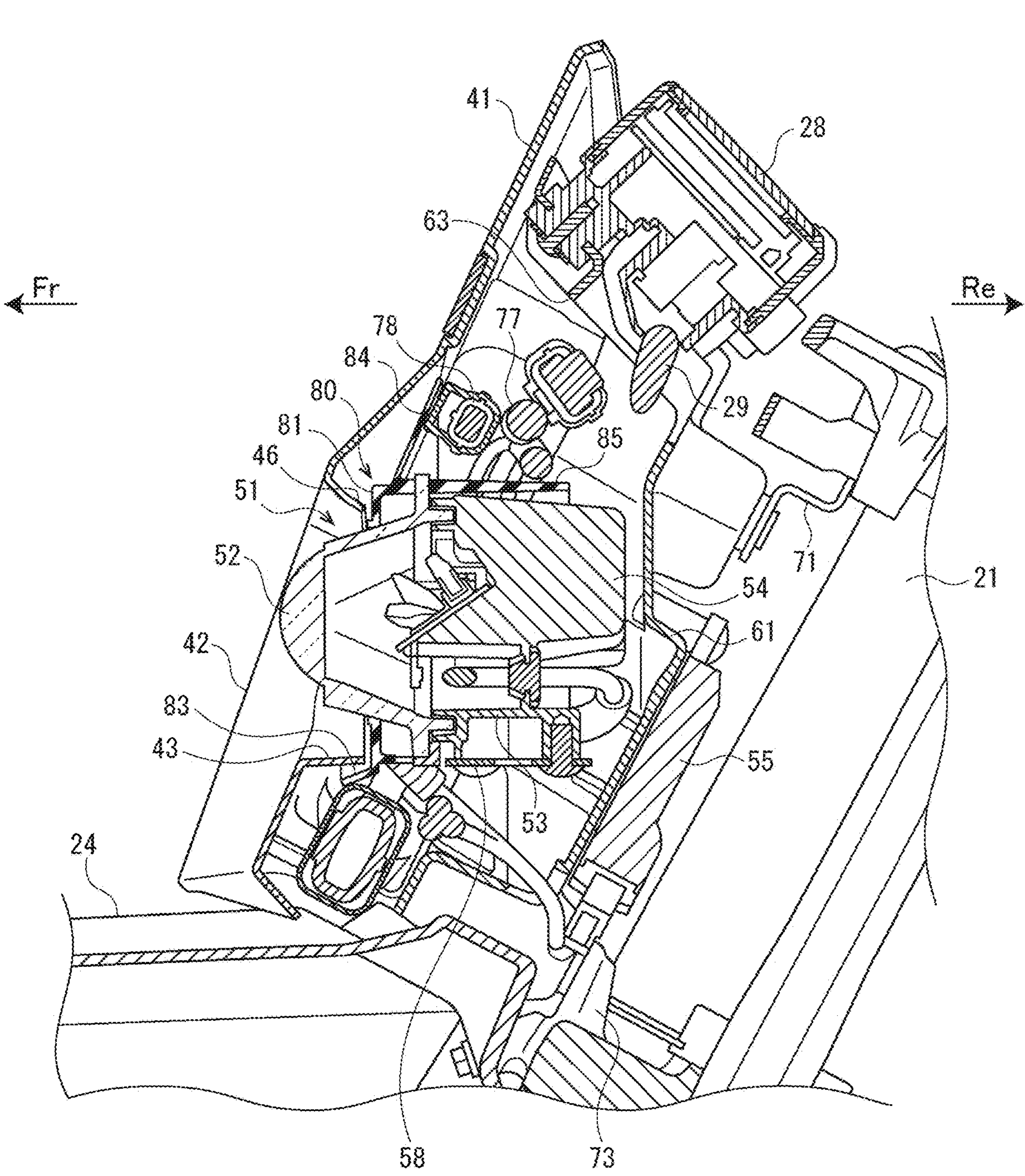
FIG. 5 is a cross-sectional view of the periphery of the headlamp in FIG. 3 taken along a line V-V.
Figure 6:
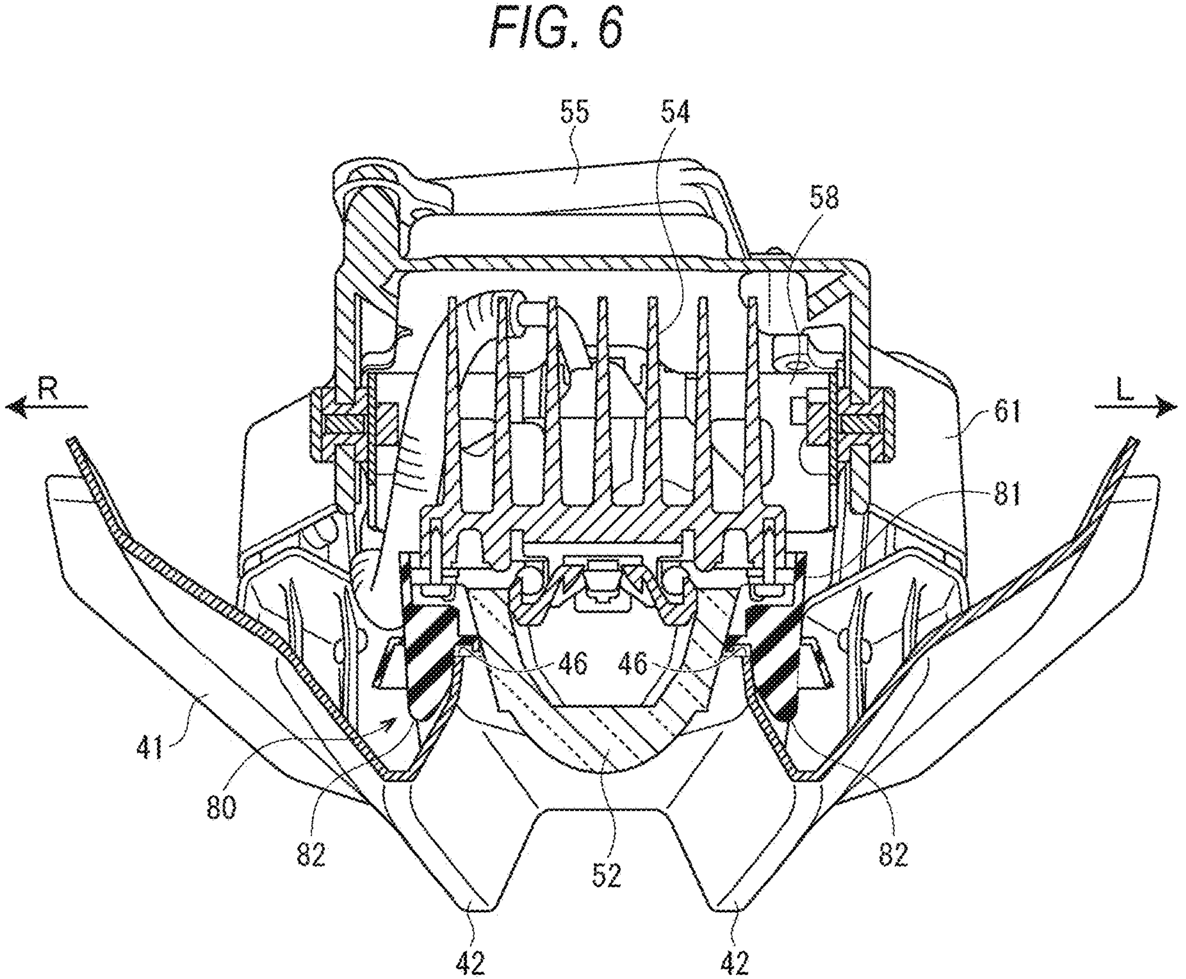
FIG. 6 is a cross-sectional view of the periphery of the headlamp in FIG. 3 taken along a line VI-VI.

The installation structure for a headlamp will be described with reference to FIGS. 3, 5, and 6. FIG. 5 is a cross-sectional view of the periphery of the headlamp in FIG. 3 taken along a line V-V. FIG. 6 is a cross-sectional view of the periphery of the headlamp in FIG. 3 taken along a line VI-VI.

As shown in FIGS. 3 and 5, the lens 52 of the headlamp 51 is located in the opening 43 of the lamp cover 41, and the gap between the lens 52 and the opening 43 of the lamp cover 41 is closed by the rubber cover 80 in a front view. In a side view, a tip end of the lens 52 is located forward of the rubber cover 80, and the tip end of the lens 52 is located rearward of a tip end of the bulging portion 42 of the lamp cover 41. Although the lens 52 protrudes forward than the rubber cover 80, the bulging portion 42 of the lamp cover 41 is formed in an inverted U-shape in the front view, so that the lens 52 is covered by the bulging portion 42 from both sides in the vehicle width direction and the upper side.

The opening edge 46 of the lamp cover 41 faces toward the vehicle rear side, and the opening edge 46 is positioned on the vehicle rear side than a front end of the headlamp 51. A lens outer surface of the headlamp 51 expands in a radial direction toward the rear side, and the gap between the lamp cover 41 and the headlamp 51 is reduced. The frame-shaped portion 81 of the rubber cover 80 is positioned behind the opening edge 46 of the lamp cover 41, and the opening edge 46 and the frame-shaped portion 81 partially overlap each other. The headlamp 51 is inserted into the frame-shaped portion 81 of the rubber cover 80 from the vehicle rear side, and an inner edge of the frame-shaped portion 81 is in contact with an outer peripheral surface of the lens 52 and is shielded by the rubber cover 80, thereby preventing light leakage.

As shown in FIGS. 3 and 6, the pair of ribs 82 of the rubber cover 80 are fitted inside the bulging portion 42 of the lamp cover 41. The rubber cover 80 is positioned in the vehicle width direction with respect to the lamp cover 41 by bringing the opposing surfaces of the pair of ribs 82 into contact with the opening edge 46 of the lamp cover 41 from an outer side in the vehicle width direction. Since the bulging portion 42 extends vertically on both sides of the headlamp 51, even if the headlamp 51 swings vertically during adjustment to the optical axis, the positional deviation of the headlamp 51 in the vehicle width direction with respect to the lamp cover 41 is prevented. Further, the pair of ribs 82 are not exposed to the outside, the appearance is improved, and the degree of freedom in shape of the pair of ribs 82 is also improved.

As shown in FIG. 3 and FIG. 5, the vertical wall portion 84 protrudes toward the vehicle upper side from the upper frame of the frame-shaped portion 81 of the rubber cover 80, and the vertical wall portion 84 is brought close to the rear surface of the lamp cover 41 toward the vehicle upper side. Since the gap between the vertical wall portion 84 and the lamp cover 41 is reduced, exposure of the lens 52 to the rear side is reduced, and light leakage from the headlamp 51 toward the rider is prevented by the vertical wall portion 84. The extension portion 83 protrudes from the lower frame of the frame-shaped portion 81 of the rubber cover 80 toward the vehicle front side, the opening edge 46 of the lamp cover 41 is covered by the extension portion 83 from below, and light leakage from the headlamp 51 toward the vehicle lower side is prevented by the extension portion 83.

The lateral wall portion 85 protrudes from the upper frame of the frame-shaped portion 81 of the rubber cover 80 toward the vehicle rear side, and the headlamp 51 is covered by the lateral wall portion 85 from above, so that light leakage from the headlamp 51 toward the rider is prevented. The lateral wall portion 85 and the vertical wall portion 84 form an installation space for the wiring 77 and the connector 78. Movement of the wiring 77 and the connector 78 is restricted by the lateral wall portion 85 and the vertical wall portion 84, so that the wiring 77 and the connector 78 are prevented from coming into contact with the headlamp 51 and the lamp cover 41. Further, it is not necessary to fix the wiring 77 and the connector 78 to the lamp cover 41 or the like by a clamp, and the number of components can be reduced.

A lamp housing 53 is provided behind the lens 52, and the heat sink 54 for heat dissipation is formed above the lamp housing 53. A plurality of vertical fins are installed in parallel and side by side in the heat sink 54, and the headlamp 51 is effectively cooled by air passing between the plurality of vertical fins from below to above. The plurality of long holes 86 (see FIG. 4B) are formed in the lateral wall portion 85 of the rubber cover 80. Hot air radiated from the heat sink 54 is exhausted through the plurality of long holes 86, and heat build-up around the headlamp 51 is reduced.

In the present embodiment, the optical axis of the headlamp 51 is adjusted by moving the headlamp 51 independently with respect to the lamp cover 41, rather than by a reflector within the headlamp 51. The rubber cover 80 closes the gap between the headlamp 51 and the opening 43 of the lamp cover 41 regardless of the direction of the optical axis of the headlamp 51. The rubber cover 80 is attached to the headlamp 51, and the headlamp 51 and the rubber cover 80 are integrally moved at the time of adjustment to the optical axis. Although there is a gap between the opening edge 46 of the lamp cover 41 and the rubber cover 80, the gap is covered by the vertical wall portion 84 and the extension portion 83 of the rubber cover 80.

The vertical wall portion 84 of the rubber cover 80 faces the rear surface of the lamp cover 41 to form a labyrinth structure. Although the irradiation light from the headlamp 51 enters a gap between an upper edge of the opening edge 46 of the lamp cover 41 and the upper frame of the rubber cover 80, the upper labyrinth structure prevents the light from leaking upward. The extension portion 83 of the rubber cover 80 faces a lower edge of the opening edge 46 of the lamp cover 41 to form a labyrinth structure. Although the irradiation light from the headlamp 51 enters a gap between the opening edge 46 of the lamp cover 41 and the lower frame of the rubber cover 80, the lower labyrinth structure prevents the light from leaking downward.

Further, when the optical axis of the headlamp 51 is adjusted upward, the headlamp 51 is swung upward, and the extension portion 83 of the rubber cover 80 comes into contact with the lower edge of the opening edge 46 of the lamp cover 41. The extension portion 83 comes into contact with the opening edge 46 of the lamp cover 41 and is deformed, allowing the optical axis of the headlamp 51 to be adjusted upward. When the optical axis of the headlamp 51 is adjusted downward, the headlamp 51 is swung downward, and the vertical wall portion 84 of the rubber cover 80 comes into contact with the rear surface of the lamp cover 41. The vertical wall portion 84 comes into contact with the rear surface of the lamp cover 41 and is deformed, allowing the optical axis of the headlamp 51 to be adjusted downward.

As described above, according to the installation structure for the headlamp 51 of the present embodiment, even if the opening 43 of the lamp cover 41 is formed large in order to adjust the optical axis by moving the headlamp 51 with respect to the lamp cover 41, the gap between the headlamp 51 and the lamp cover 41 is closed by the rubber cover 80, thereby improving the appearance. Further, the adjustment to the optical axis of the headlamp 51 is not hindered due to the deformation of the rubber cover 80, and the light leakage from the headlamp 51 is prevented by the rubber cover 80, so that the field of vision of a rider is not impaired.

In the present embodiment, the pair of ribs are in contact with the opening edge of the lamp cover from the outer side in the vehicle width direction. Alternatively, the pair of ribs may be in contact with the opening edge of the lamp cover from an inner side in the vehicle width direction.

Further, in the present embodiment, the rubber cover is exemplified as the elastic cover. Alternatively, the elastic cover may be formed of a material that is soft enough not to interfere with adjustment to the optical axis of the headlamp.

The installation structure for a headlamp according to the present embodiment is not limited to the straddle-type vehicle as described above, and may be used in other types of straddle-type vehicles. The straddle-type vehicle is not limited to a general vehicle in which a driver rides on a seat in a posture straddling the seat, and includes a scooter-type vehicle in which the driver rides on the seat without straddling the seat.

As described above, a first aspect includes: a headlamp (51) provided with a lens (52) configured to emit irradiation light toward a front of a vehicle; a lamp cover (41) formed with an opening (43) for exposing the lens; and an elastic cover (80) configured to close a gap between the headlamp and the opening of the lamp cover, in which the headlamp is moved with respect to the lamp cover to adjust an optical axis, and the elastic cover closes the gap between the headlamp and the opening of the lamp cover regardless of a direction of the optical axis of the headlamp. According to this configuration, even if the opening of the lamp cover is formed large in order to adjust the optical axis by moving the headlamp with respect to the lamp cover, the gap between the headlamp and the lamp cover is closed by the elastic cover, thereby improving the appearance. Further, the adjustment to the optical axis of the headlamp is not hindered due to the deformation of the elastic cover, and the light leakage from the headlamp is prevented by the elastic cover, so that the field of vision of a rider is not impaired.

A second aspect is directed to the first aspect, in which an opening edge (46) of the lamp cover faces toward a vehicle rear side, and the opening edge is positioned on the vehicle rear side than a front end of the headlamp. According to this configuration, the gap between the lamp cover and the headlamp can be reduced, and light leakage from the headlamp toward the rider can be prevented by the elastic cover.

A third aspect is directed to the first or second aspect, in which the elastic cover is provided with a pair of ribs (82) configured to come into contact an opening edge of the lamp cover in a vehicle width direction. According to this configuration, since the pair of ribs of the elastic cover come into contact with the opening edge of the lamp cover, the positional deviation of the headlamp in the vehicle width direction with respect to the lamp cover is prevented when adjusting the optical axis of the headlamp.

A fourth aspect is directed to the third aspect, in which the pair of ribs are located inside the lamp cover and come into contact with the opening edge of the lamp cover from an outer side in the vehicle width direction. According to this configuration, the pair of ribs are not exposed to the outside, and the appearance is improved. In addition, the degree of freedom in the shape of the ribs is also improved.

A fifth aspect is directed to any one of the first to fourth aspects, in which a vertical wall portion (84) protrudes from an upper portion of the elastic cover toward a vehicle upper side, and the vertical wall portion is brought close to a rear surface of the lamp cover toward the vehicle upper side. According to this configuration, light leakage from the headlamp toward the rider is prevented by the vertical wall portion of the elastic cover.

A sixth aspect is directed to the fifth aspect, in which a lateral wall portion (85) protrudes from an upper portion of the elastic cover toward a vehicle rear side, and the lateral wall portion and the vertical wall portion form an installation space for wiring (77) and/or a connector (78). According to this configuration, light leakage from the headlamp toward the rider is prevented by the lateral wall portion of the elastic cover. Movement of the wiring and/or the connector is restricted by the lateral wall portion and the vertical wall portion, so that the wiring and/or the connector are prevented from coming into contact with the headlamp and the lamp cover. In addition, components such as clamps can be reduced.

A seventh aspect is directed to any one of the first to sixth aspects, in which a heat sink (54) for heat dissipation is provided behind the lens, and a lateral wall portion protrudes from an upper portion of the elastic cover toward a vehicle rear side to cover the heat sink from above, and a plurality of heat dissipation holes (long holes 86) are formed in the lateral wall portion. According to this configuration, light leakage from the headlamp toward the rider is prevented by the lateral wall portion of the elastic cover. Further, hot air from the heat sink can be exhausted through the plurality of heat dissipation holes.

Although the present embodiment has been described, a part or all of the above-described embodiment and a modification may be combined as another embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An installation structure for a headlamp comprising:

a headlamp including a lens configured to emit irradiation light toward a front of a vehicle;

a lamp cover having an opening through which the lens is exposed; and an elastic cover configured to close a gap between the headlamp and the opening of the lamp cover, wherein the headlamp is configured to be moved with respect to the lamp cover to adjust an optical axis, wherein the elastic cover closes the gap between the headlamp and the opening of the lamp cover regardless of a direction of the optical axis of the headlamp, wherein the elastic cover is provided with a pair of ribs configured to come into contact with an opening edge of the lamp cover in a vehicle width direction, and wherein the pair of ribs are located inside the lamp cover, and come into contact with the opening edge of the lamp cover from an outer side in the vehicle width direction.

2. The installation structure for a headlamp according to claim 1, wherein an opening edge of the lamp cover faces toward a vehicle rear side, and the opening edge is positioned on the vehicle rear side of a front end of the headlamp.

3. The installation structure for a headlamp according to claim 1, wherein the elastic cover closes the gap between the headlamp and the opening of the lamp cover around an entire periphery of the headlamp.

4. An installation structure for a headlamp comprising:

a headlamp including a lens configured to emit irradiation light toward a front of a vehicle;

a lamp cover having an opening through which the lens is exposed; and an elastic cover configured to close a gap between the headlamp and the opening of the lamp cover, wherein the headlamp is configured to be moved with respect to the lamp cover to adjust an optical axis, wherein the elastic cover closes the gap between the headlamp and the opening of the lamp cover regardless of a direction of the optical axis of the headlamp, wherein a vertical wall portion protrudes from an upper portion of the elastic cover toward a vehicle upper side, wherein the vertical wall portion is brought close to a rear surface of the lamp cover toward the vehicle upper side, wherein the vertical wall portion is formed along a rear surface of the lamp cover, and wherein the vertical wall portion extends farther outward in a lateral direction than the lateral outer end of the headlamp lens.

5. The installation structure for a headlamp according to claim 4, wherein a lateral wall portion protrudes from an upper portion of the elastic cover toward a vehicle rear side, and the lateral wall portion and the vertical wall portion form an installation space for at least one of wiring or a connector.

6. The installation structure for a headlamp according to claim 4, wherein a center portion of the elastic cover is formed in a frame shape, and the headlamp is exposed through the inside of a frame-shaped portion of the elastic cover, wherein the vertical wall portion protrudes toward the vehicle upper side from an upper frame of the frame-shaped portion of the elastic cover, and wherein the vertical wall portion has lateral end portions, each of the lateral end portions extends outward in the vehicle width direction farther than each edge of an opening of the frame-shaped portion of the elastic cover.

7. The installation structure for a headlamp according to claim 6, wherein the elastic cover closes the gap between the headlamp and the opening of the lamp cover around entire periphery of the headlamp.

8. An installation structure for a headlamp comprising:

a headlamp including a lens configured to emit irradiation light toward a front of a vehicle;

a lamp cover having an opening through which the lens is exposed; and an elastic cover configured to close a gap between the headlamp and the opening of the lamp cover, wherein the headlamp is configured to be moved with respect to the lamp cover to adjust an optical axis, wherein the elastic cover closes the gap between the headlamp and the opening of the lamp cover regardless of a direction of the optical axis of the headlamp, wherein a heat sink for heat dissipation is provided behind the lens, and wherein a lateral wall portion protrudes from an upper portion of the elastic cover toward a vehicle rear side to cover the heat sink from above, and a plurality of heat dissipation holes are formed in the lateral wall portion.

* * * * *